United States Patent
Foisy

(10) Patent No.: US 8,825,857 B2
(45) Date of Patent: Sep. 2, 2014

(54) LOAD BALANCING FOR PACKET SWITCHED ALARM MONITORING

(75) Inventor: Stephane Foisy, Udora (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 527 days.

(21) Appl. No.: 12/854,351

(22) Filed: Aug. 11, 2010

(65) Prior Publication Data

US 2011/0040877 A1 Feb. 17, 2011

Related U.S. Application Data

(60) Provisional application No. 61/232,849, filed on Aug. 11, 2009.

(51) Int. Cl.
*G06F 15/173* (2006.01)

(52) U.S. Cl.
USPC ............................. 709/226; 709/220; 709/245

(58) Field of Classification Search
USPC ......................................................... 709/226
See application file for complete search history.

(56) References Cited

U.S. PATENT DOCUMENTS

| | | | |
|---|---|---|---|
| 6,560,630 B1 * | 5/2003 | Vepa et al. | 718/105 |
| 8,073,934 B1 * | 12/2011 | Zhong et al. | 709/220 |
| 2004/0109440 A1 | 6/2004 | Mattathil | |
| 2004/0153549 A1 * | 8/2004 | Naito et al. | 709/228 |
| 2005/0198277 A1 | 9/2005 | Wada et al. | |
| 2006/0068753 A1 | 3/2006 | Karpen et al. | |

OTHER PUBLICATIONS

International Searching Authority, International Search Report and Written Opinion dated Dec. 7, 2010 for International Application No. PCT/CA2010/001241, International Filing Date: Aug. 11, 2010 (9 pages).

* cited by examiner

*Primary Examiner* — Hua Fan
(74) *Attorney, Agent, or Firm* — Smart & Biggar

(57) ABSTRACT

Alarm panels are assigned to monitoring servers at a monitoring station by an allocation server. Each panel obtains the data network address of its assigned monitoring server by contacting the allocation server, upon installation/configuration. The provided data network address is stored at the panel for later use. This allows the allocation server to fairly and flexibly distribute monitoring responsibility for the many panels across multiple monitoring servers.

8 Claims, 3 Drawing Sheets

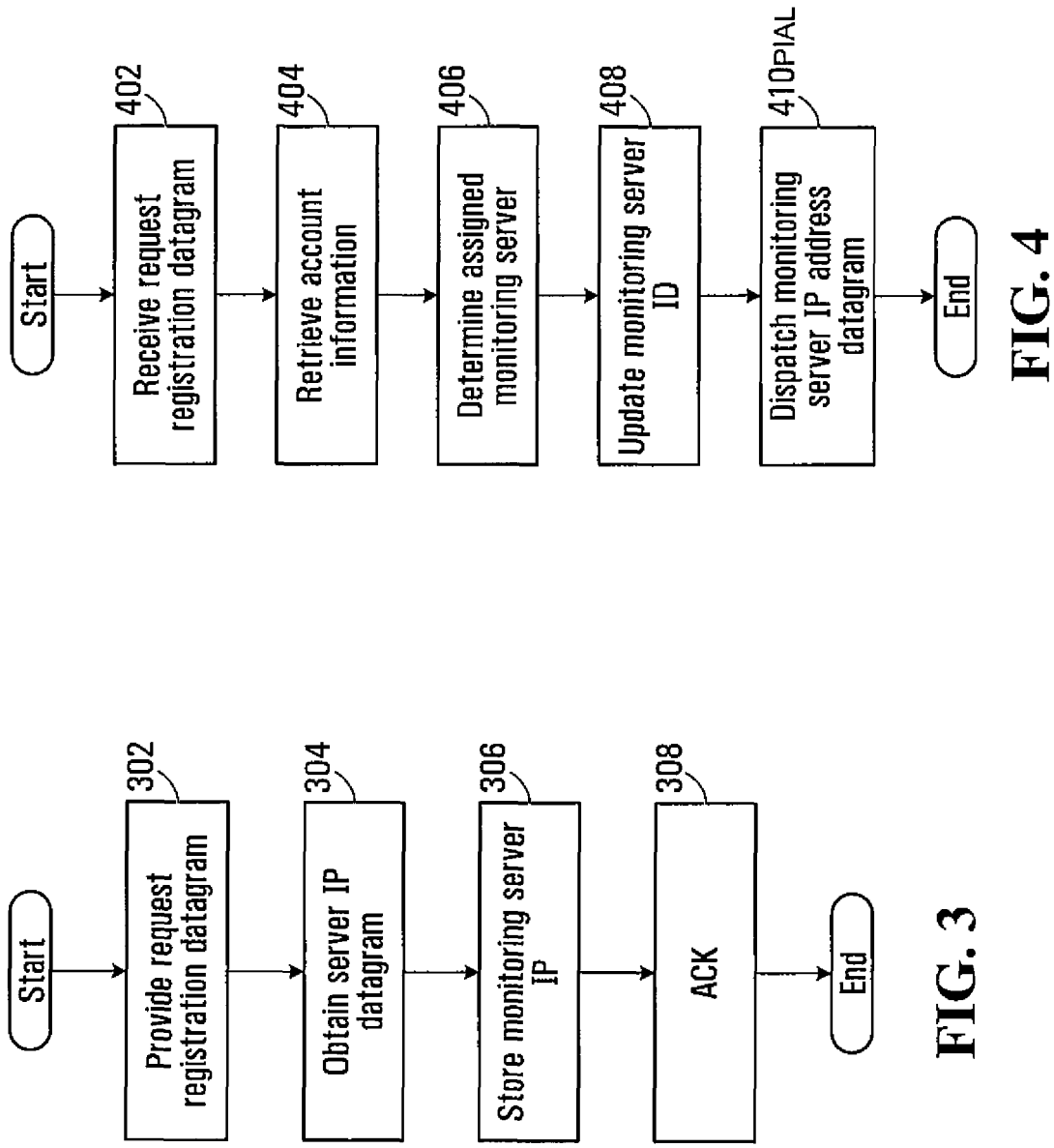

LOAD BALANCING FOR PACKET SWITCHED ALARM MONITORING

CROSS-REFERENCE TO RELATED APPLICATIONS

This application claims benefits from U.S. Provisional Patent Application No. 61/232,849 filed Aug. 11, 2009, the contents of which are hereby incorporated herein by reference.

FIELD OF THE INVENTION

The present invention relates generally to security systems, and more particularly to methods and devices for load balancing of alarm monitoring facilities.

BACKGROUND OF THE INVENTION

It is common for businesses and homeowners to have a security system for detecting alarm conditions at their premises and reporting these to a monitoring station. One of the primary functions of the monitoring station is to notify a human operator when one or more alarm conditions have been sensed by detectors installed at a monitored premise.

Detectors may vary from relatively simple hard-wired detectors, such as door or window contacts to more sophisticated battery operated ones such as motion and glass break detectors. The detectors may all report to an alarm control panel at the premises. The control panel is typically installed in a safe location and is connected to a power supply. The control panel is further in communication with the individual detectors to communicate with or receive signals from individual detectors. The communication between the alarm control panel and the detectors can be one or two way, and may be wired or wireless.

Upon being notified of a detected alarm condition, the control panel typically placed a phone call using the public switched telephone network (the "PSTN") to a monitoring station whose telephone number has been pre-programmed into the panel. At the monitoring station, the call was received by a complementary interface. Thereafter, the panel notified the interface at the monitoring station using a protocol understood by both the panel and monitoring station.

As a single telephone number was used to service many alarm panels, some mechanism to handle call overflow was required. One way of handling call overflow relied on the use of multiple alarm monitoring servers, having phone numbers configured in PSTN "hunt groups". As is understood, hunt groups were (and still are) supported by many private branch exchanges (PBX) and centrex services. Hunt groups allowed calls to a single telephone number to be transferred to other lines associated with other numbers in a group, in the event the line of the single number is busy or unavailable. In this way, multiple alarm monitoring servers, each with their own phone lines, configured in a hunt group, could be used to service calls from many panels. At the same time, the load placed on the collection of servers could be balanced.

Modern alarm system designs are moving away from use of the PSTN and are instead relying on packet switched data networks, like the Internet. In such systems, load sharing may be accomplished by fairly assigning different alarm panels to different servers. This may be done manually by installers so that different panels contact different servers. Such manual intervention, however, is cumbersome and may be error prone.

Accordingly, there remains a need for a methods and devices that allow effective load sharing for alarm systems using such data networks.

SUMMARY OF THE INVENTION

Exemplary of an embodiment of the invention, alarm panels are assigned to monitoring servers at a monitoring station by an allocation server. Each panel obtains the data network address of its assigned monitoring server by contacting the allocation server, upon installation/configuration. The provided data network address is stored at the panel for later use. This allows the allocation server to fairly and flexibly distribute monitoring responsibility for the many panels across multiple monitoring servers.

In accordance with an aspect of the present invention, there is provided a method of configuring a panel of an alarm system that signals sensed conditions to a monitoring server over a packet switched data network. The method comprises: contacting an allocation server over the data network, at a pre-programmed network address; obtaining from the allocation server, the data network address of a monitoring server assigned to the panel; storing the data network address of the monitoring server assigned to the panel at the panel, for future provision of alarm messages.

In accordance with another aspect of the present invention, there is provided a method of allocating one of a plurality of available monitoring servers each having a data network address to a panel of an alarm system. The method comprises: receiving a datagram requesting assignment of one of the monitoring servers over a data network; determining an available one of the plurality of monitoring servers to be used to receive alarm messages from the panel; dispatching a data network address of the one of the plurality of monitoring servers to the panel.

In accordance with yet another aspect of the present invention, there is provided an alarm monitoring station comprising: a plurality of monitoring servers for receiving alarm notifications from panels at monitored premises; an allocation server comprising a processor, a network interface and memory storing processor executable instructions adapting the allocation server to receive a datagram from an alarm panel being initialized, requesting assignment of one of the monitoring servers over the data network; determine an available one of the plurality of monitoring servers to be used to receive alarm messages from the alarm panel being initialized; dispatch a data network address of the one of the plurality of monitoring servers to the alarm panel being initialized.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIGS. 3 and 4 are flow diagrams depicting steps performed at the alarm panel and central monitoring station of FIG. 1, exemplary of an embodiment of the present invention.

DETAILED DESCRIPTION

Figure 1:
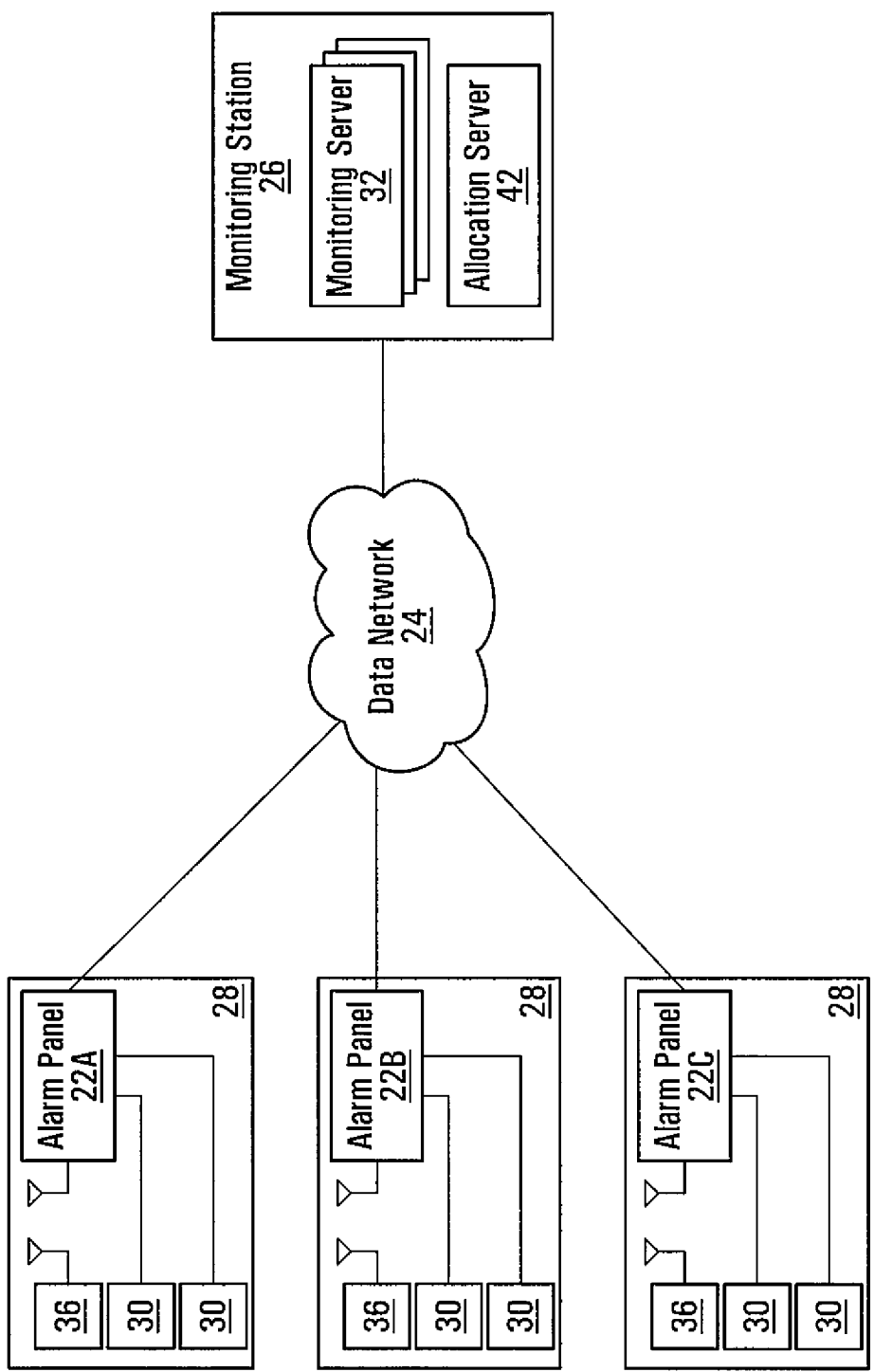
FIG. 1 is a schematic diagram of an alarm system, exemplary of an embodiment of the present invention.

FIG. 1 depicts an exemplary security system infrastructure 20 of security systems including multiple alarm panels 22a, 22b, 22c (individually and collectively panel 22) at customer premises 28a, 28b, 28c (individually and collectively premises 28), respectively, communicating through a data network 24 such as the Internet, with a central monitoring station 26. As will be appreciated, data network 24 may be any combination of wired and wireless links capable of carrying packet switched traffic, and may span multiple carriers, and a wide geography. In one embodiment, data network 24 may simply be the public Internet. Further access points, such as DSL modems, wireless radios, and the like possibly interconnecting panels 22 with data network 24 are not illustrated. Interconnected devices, such as network interface case (NICs) are assigned source data network addresses dynamically using known-networking protocols (e.g. DHCP), or statically.

At residential or business premises 28, each alarm panel 22 may be interconnected with one or more detectors 30. Each of detectors 30 provides information regarding the status of the monitored premises to a local alarm panel 22. Detectors 30 may include, for example, motion detectors, glass break detectors, and contact switches. Detectors 30 may be hard wired to alarm panel 22 or may communicate with alarm panel 22 wirelessly, in manners known to persons of ordinary skill in the art. Alarm panel 22 may further include other interfaces such as key pads, sirens, and the like, not specifically shown in FIG. 1.

A typical alarm panel 22 includes a processor; memory in communication with the processor, storing program instructions and configuration data for the processor/alarm panel 22; a detector interface for communication with detectors 30; and a network interface for communication with data network 24. Example alarm panels include Digital Security Controls models PC1864 and PC9155, suitable modified to operate as described herein. Optionally, such panels may include a further interface to the PSTN that may, for example, be used for backup purposes in manners not described herein.

Program instructions stored in memory of alarm panel 22, along with configuration data may control overall operation of panel 22. In particular, one or more data network addresses may be stored in memory of alarm panel 22. These network addresses may include the internet protocol network addresses of central monitoring station (e.g. "216.0.0.155" for central monitoring station 26), or alternate network address by which central monitoring station 26 may be reached. Alarm panel 22 may send data representative of sensed alarm events to central monitoring station 26 over data network 24, using a packet switched protocol, such as the internet protocol.

Central monitoring station 26 is depicted as a single monitoring station in FIG. 1; however, it could alternatively be formed of multiple monitoring stations, each at a different physical location, and each in communication with data network 24. In particular, in order to process a high volume of alarm conditions from a large number of subscribers, central monitoring station 26 includes a plurality of monitoring servers—often referred to in the art as monitoring receivers. As will become apparent each monitoring server 32 processes alarm messages from a subset of the subscribers serviced by monitoring station 26.

Figure 2:
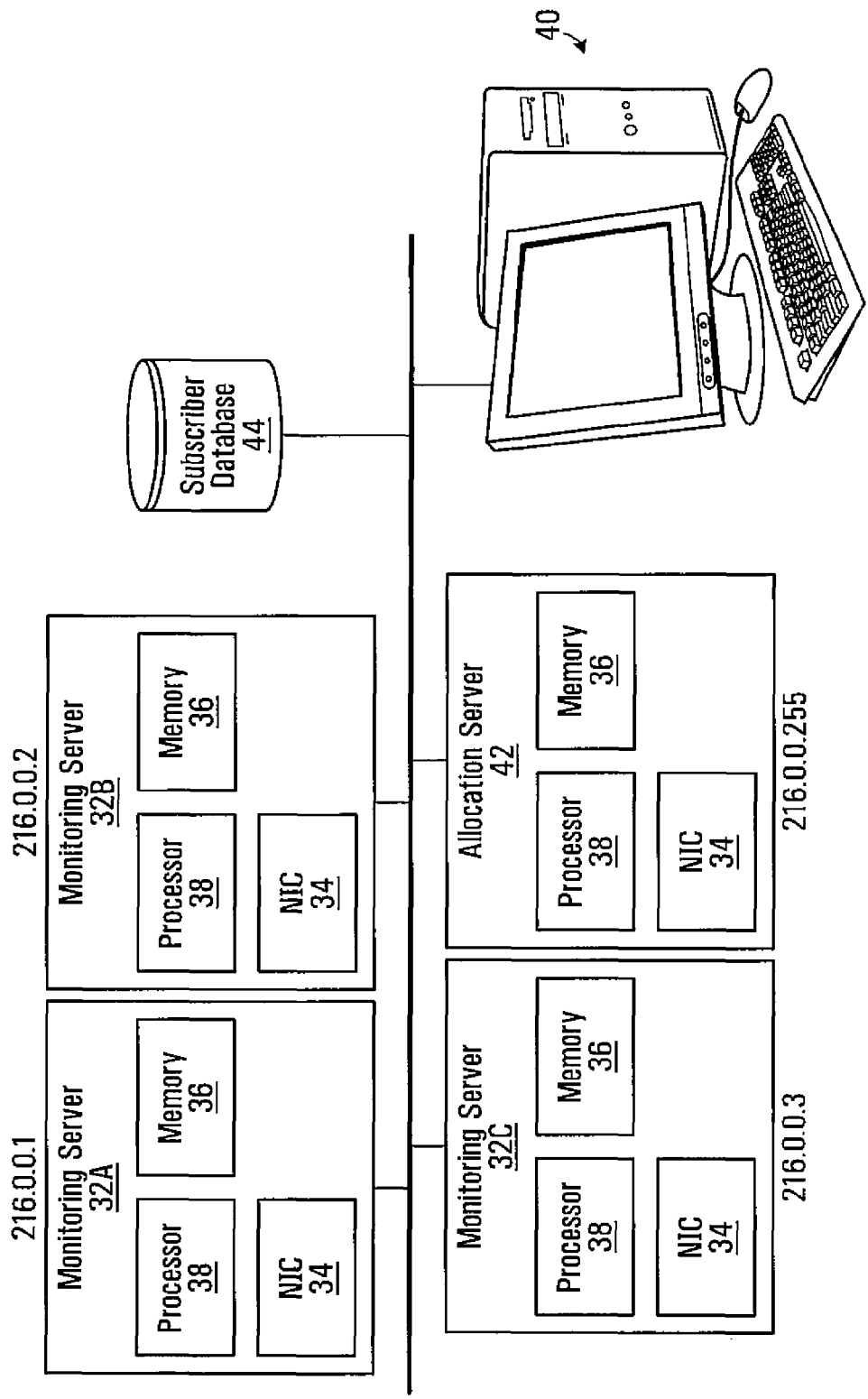
FIG. 2 is a schematic block diagram of a central monitoring station in the alarm system of FIG. 1.

FIG. 2 is a schematic block diagram of an exemplary central monitoring station 26. Specifically, monitoring station 26 may include multiple monitoring servers 32—for illustration purposes only three monitoring servers 32a, 32b, and 32c are illustrated.

As depicted in FIG. 2, each monitoring server 32 may include a network interface 34 and a processor 38. Monitoring servers 32 may be in communication with one or more terminals 36, exemplary of an embodiment of the present invention. Monitoring servers 32 may physically take the form of rack mounted cards.

Each monitoring server 32 of, central monitoring station 26 may be associated with an IP address and port by which it can be contacted by alarm panels 22 to report alarm events over data network 24. In the depicted embodiment, monitoring server 32a is associated with IP address 216.0.0.1; monitoring server 32b is associated with IP address 216.0.0.2; and monitoring server 32c is associated with IP address 216.0.0.3. These addresses may be static, and thus always identify a particular one of servers 32 to the computing communicating over data network 24. Alternatively, dynamic addresses could be used, and associated with static domain names, resolved through a domain name service. As well, in the depicted embodiment, servers 32 are interconnected on a local area network. A suitable router (not shown) may route data between servers 32 and to respective servers at their associated IP addresses.

Processor 38 of each monitoring server 32 acts as a controller for each monitoring server 32, and is in communication with, and controls overall operation, of each network interface 34. Processor 38 may include, or be in communication with, memory 36 controlling the overall operation of monitoring server 32. Network interface 34 may be a conventional network interface that interfaces with data network 24 to receive incoming signals, and may for example take the form of an Ethernet network interface card (NIC). Terminal(s) 40 may be computers, or the like, to which received data representative of an alarm event is passed for handling by human operators.

Monitoring station 26 may further include subscriber database 44 that includes a database under control of a database engine. Database 44 may contain entries corresponding to the various subscribers serviced by monitoring station 26. Database 44 may for example include the names and addresses, phone number, contact number, for each subscriber at premises 28 (FIG. 1). As well, database 44 may include the particulars of each detector 30, the identifier of each panel 22 assigned to a particular subscriber; account information; local fire and police contact information; other contact information if a primary is not reachable; pertinent details about the premises to provide to the local authorities (colour of house, entrance, etc.); the level of security the account has (e.g. a bank alarm would have a higher security then a home alarm); and the like.

Central monitoring station 26 receives and processes incoming messages from panels 22. Extracted data from the messages may, for example, be overhead, or alarm data. The alarm data may be passed to processor 38, which, in turn, may make decisions based upon that data. In particular, processor 38 may be programmed to initiate certain alarm handling procedures based on the received data.

For example, alarm data extracted from one or more incoming alarm data signals may specify that a particular detector 30 at a particular monitored premise 28 was tripped. Processor 38 may be programmed to notify a human operator using the alarm data, for further action. Further action may include the human operator consulting, and calling, one of a list of phone numbers associated with that particular monitored premise. For example, the list may include the telephone number of the homeowner, and the operator may call the homeowner to determine what the problem was/is.

As should be apparent, the foregoing requires that the central monitoring station 26 be able to identify and process incoming data, and to be able to correlate the data to specific monitored premises 28. Ideally, in order to balance the load on monitoring station 26, each monitoring server 32 processes data from a subset of the monitored alarm panels 24.

Distributing the load amongst monitoring servers 32 provides some challenges. As such, exemplary of an embodiment of the present invention, monitoring station 22 further includes an allocation server 42. Allocation server 42 is architecturally similar to monitoring server 32, and also includes a processor 38, memory 36 and a network interface card 34. Memory includes instructions that assigns each newly activated alarm panel to one of monitoring servers 22. In fact, in an embodiment, one or all of monitoring servers 32 could be pre-programmed to act both as allocation server 42 and monitoring server 32, as described herein.

Now, in order to balance the load among monitoring servers 32, each panel undergoes a registration procedure with allocation server 42. Steps performed at panel 22 and allocation server 42 are depicted in FIGS. 3 and 4. In the depicted embodiment, each panel 22 is pre-programmed with the network address of allocation server 42 (for the example addresses—216.0.0.255). Upon initial installation of a panel 22 at premises 28, panel 22 contacts allocation server 42 in step S302 and provides allocation server with a datagram requesting registration among monitoring servers 32. The datagram may include a unique identifier of panel 22 and its associated account number, the MAC address of the NIC of panel 22, or other unique serial information programmed into panel 22 prior to installation. As well, the datagram will typically include an identifier of the datagram as a registration request datagram. Optionally, the datagram may include a further hash or cryptographic key to avoid unauthorized communications.

Server 42 may retrieve the account information from subscriber database 44 in step S402 and determine which one of servers 32 should act as the monitoring server for that panel in step S404.

In making the allocation determination, allocation server 42 may use any of a number of considerations. For example, allocation server 42 may allocate panels 22 to monitoring servers 32 based on the source IP addresses of panels (and thus the geography of the monitored premises). IP addresses from the same geography may be distributed across the multiple monitoring servers 32. In this way a monitored event affecting an entire geography (e.g. power outage) may be distributed across the multiple monitoring servers 32. Panels 22 may be allocated to servers 32 based on panel or account requirement. For example, if a panel 22 supports encryption, allocation server 42 may select one of servers 32 that supports encryption. Likewise, if panel 22 supports other non-standard features, allocation server 42 may assign a monitoring server that supports the feature. Likewise, if panel 22 is associated with a particularly valuable premise (e.g. bank, industrial facility, etc.), the panel may be allocated to a particular monitoring server 32 that may offer increased redundancy, reliability, etc. Similarly, allocation server 42 may assign the transmitter to a particular monitoring server 32, based on the software version executing at the panel 22, allowing versions of software on panel 22 to be handled by specific monitoring servers 32. This may allows protocol upgrades that may be forward compatible. Accordingly, conflicts between older and newer versions of software executing on various panels 22 should they associated with the same monitoring server 32 can be avoided.

Alternatively, allocation server 42 may simply assign panel 22 to the monitoring server having the least load (i.e. servicing the fewest panels). Of course, allocation server 42 attempts to share monitoring responsibility among multiple servers 32.

Once a monitoring server 32 has been identified for a particular panel, the database 44 may be updated to reflect that a particular panel has been assigned a monitoring server. As well, a table at the assigned monitoring server 32 may be updated to include the account number or other identifier associated with the newly added panel 22 in step S408. Next, a monitoring server IP address datagram to the destination IP address of panel 22 is generated and dispatched by allocation server 42 in step S410, identifying the monitoring server for that panel.

Upon receipt of the message, panel 22 stores the IP address of the assigned monitoring server in its memory for future use. Optionally, panel 22 may send a further acknowledgement message to allocation server 42 or monitoring server 32 confirming that the newly assigned monitoring server has been stored at panel 22 in step S306.

At this time, initialization of panel 22 is complete, and panel 22 is said to be registered with monitoring station 26.

Now, in the presence of an alarm condition at panel 22, panel 22 generates an alarm messages and dispatches it to the assigned monitoring server 32 for that panel 22 using the address stored in step S306. Each alarm message includes at least an identifier of the panel and the sensed condition. Monitoring server 32, upon receipt of the message may identify the generate a message or communication (i.e. phone call, etc) for down stream handling, to eventually dispatch personnel to the monitored premises as required.

As noted, each monitoring server 32 may be programmed to act as allocation server 42. In an embodiment, the role of allocation server 42 may be assumed by a monitoring server 32 to which a maximum number of panels have been allocated, or by the monitoring server 32 to which a maximum number of panels has most recently been allocated.

In further embodiments, the allocation server 42 (or a monitoring server 32) may cause a particular panel to repeat the registration process, so that particular panel 22 may be assigned to a different monitoring server 32. This may, for example, be done if a new monitoring server 32 is added at monitoring station 26, or a monitoring server 32 is upgraded to support new features, or communication difficulties are diagnosed between one or more panels 42 and a particular monitoring server 32. To this end, an allocation server 42 (or monitoring server 32) may dispatch a reset datagram to the particular panel. This, in turn will cause the panel to again perform steps S302 and onward. Allocation server 42, now having knowledge that the particular alarm panel 22 has been sent a reset datagram, may await the alarm panel's registration request datagram, and in response assign a new monitoring server 32 (including, for example, a specific monitoring server 32), as desired.

In further embodiment, a panel may attempt to repeat the registration process by repeating steps S302 to S308 any time a panel fails to communicate with its assigned monitoring server one or more times.

In further embodiments, allocation server 42 may not be contacted directly by panel 22. Instead, a panel 22 may send its registration request datagram to a monitoring server 32, or another intermediary (e.g. some other server, not illustrated)) that may forward the registration request datagram to allocation server 42. The intermediary could likewise store and forward any monitoring server IP address datagram provided to the panel 22.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of operating an alarm system at a premises, said alarm system comprising a panel and a plurality of sensors at said premises, said panel comprising a network interface, a processor and memory at said premises, said method comprising:
    a. from said panel, contacting an allocation server remote from said premises over a data network, at a pre-programmed network address and providing a unique identifier of said panel, said allocation server executing software causing said allocation server to assign a monitoring server based on said unique identifier of said panel, and at least one of a geographic location of said panel, features of said panel, and a version of software executing at said panel;
    b. at said panel, obtaining from said allocation server, a data network address of a monitoring server remote from said premises, assigned to said panel based on said unique identifier of said panel, and at least one of a geographic location of said panel, features of said panel, and a version of software executing at said panel;
    c. at said panel storing said data network address of said monitoring server assigned to said panel and obtained by said panel from said allocation server in said memory at said panel, for future provision of alarm messages;
    d. in response to a sensed alarm condition at said premises, retrieving said data network address of said monitoring server assigned to said panel from said memory at said panel and signalling from said panel, said sensed alarm condition at said premises by dispatching an alarm message to said data network address of said monitoring server assigned to said panel, by way of said network interface.

2. The method of claim 1, wherein said monitoring server assigned to said panel is assigned to balance the load on a plurality of monitoring servers.

3. The method of claim 1, wherein said monitoring server assigned to said panel is assigned based on the source data network address of said panel.

4. The method of claim 1, further comprising repeating said contacting, said obtaining, and said storing in response to receiving a reset datagram at said panel.

5. A method of allocating one of a plurality of available monitoring servers each having a data network address to a panel of an alarm system at a premises, said panel comprising a processor and memory for sensing alarm conditions at said premises and reporting said alarm conditions to an assigned one of said monitoring servers by way of a data network, wherein said plurality of available monitoring servers are located remote from said premises, said method comprising:
    at an allocations server, remote from said premises receiving a datagram requesting assignment of one of said monitoring servers over a data network, from said panel said datagram comprising a unique identifier of said panel;
    at said allocation server determining, based on said unique identifier based, and at least one of a geographic location of said panel, features of said panel, and a version of software executing at said panel, an available one of said plurality of monitoring servers to be used to receive alarm messages from said panel;
    from said allocation server dispatching a data network address of said one of said plurality of monitoring servers to said panel for storage in memory of said panel for later use by said panel in signalling a sensed alarm condition.

6. The method of claim 5, wherein said determining is performed to balance the load on a plurality of monitoring servers.

7. The method of claim 5, wherein said determining is performed based on the source data network address of said panel.

8. An alarm monitoring station comprising:
    a plurality of monitoring servers for receiving alarm notifications from alarm panels at monitored premises, said monitored premises remote from said alarm monitoring station;
    an allocation server comprising a processor, a network interface and memory storing processor executable instructions adapting said allocation server to
        receive a datagram from an alarm panel that is being initialized, requesting assignment of one of said monitoring servers over said data network comprising a unique identifier uniquely identifying said panel to said allocation server;
        determine at said allocation server, based on said unique identifier of said panel, and at least one of a geographic location of said panel, features of said panel, and a version of software executing at said panel, an available one of said plurality of monitoring servers to be used to receive alarm messages from said alarm panel that is being initialized;
        dispatch from said allocation, a data network address of said one of said plurality of monitoring servers to said alarm panel that is being initialized for storage in memory of said alarm panel that is being initialized, for later use by said alarm panel that is being initialized in signalling a sensed alarm condition to said one of said plurality of monitoring servers.

* * * * *